United States Patent [19]

Iwatani

[11] 4,198,301
[45] Apr. 15, 1980

[54] FILTER APPARATUS USING FLOATING FILTER MEDIUM

[75] Inventor: Akitoshi Iwatani, Muragame, Japan

[73] Assignee: Ishigaki Kiko Co., Ltd., Tokyo, Japan

[21] Appl. No.: 935,697

[22] Filed: Aug. 21, 1978

[30] Foreign Application Priority Data

May 19, 1978 [JP] Japan .............................. 53-68337[U]

[51] Int. Cl.² ....................... B01D 29/38; B01D 33/38
[52] U.S. Cl. .................................................. 210/274
[58] Field of Search ............... 210/274, 276, 283, 290, 210/20, 393, 32, 333 A, 333 R, 106, 108

[56] References Cited

U.S. PATENT DOCUMENTS

| | | | |
|---|---|---|---|
| 887,069 | 5/1908 | Cotter | 210/274 |
| 3,725,240 | 4/1973 | Baum | 208/22 |
| 4,036,854 | 7/1977 | Chang | 210/274 |
| 4,052,300 | 10/1977 | Mosso | 210/20 |

FOREIGN PATENT DOCUMENTS

| | | |
|---|---|---|
| 120867 | 11/1918 | United Kingdom ...................... 210/274 |
| 123152 | 2/1919 | United Kingdom ...................... 210/274 |
| 903800 | 11/1962 | United Kingdom ...................... 210/20 |

*Primary Examiner*—Charles N. Hart
*Assistant Examiner*—E. Rollins Cross

[57] ABSTRACT

A filter apparatus wherein the filter tank is separated by a water-penetrable partition wall into an upper section forming a filtrate reservoir and a lower section forming a filter chamber. Floating filter medium is placed in the filter chamber. Water to be filtered is fed into the filter chamber at the bottom thereof and caused to flow upward, passing through the floating filter medium. The filtrate is removed from reservoir. The apparatus is further characterized by the improvement including: apparatus for agitating the filter medium, a pit beneath the filter chamber, a siphon-shaped discharge pipe for back-flow wash water with a discharge opening positioned adjacent the bottom of the pit, the discharge pipe being provided with a siphon breaker having an air feed port positioned adjacent the bottom of the filter chamber, a supply pipe for feeding water to be filtered into the filter chamber with a feed opening positioned adjacent the bottom of the filter chamber so as not to disturb water retained in the pit.

10 Claims, 4 Drawing Figures

FILTER APPARATUS USING FLOATING FILTER MEDIUM

BACKGROUND AND SUMMARY

This invention relates to a filter apparatus using a floating filter medium.

A filter apparatus is known which is designed to use a floating filter medium such as expanded polystyrene or polypropylene or polyethylene in granulated or granular form having a lower specific gravity than water to be filtered. In such a filter apparatus, the filter medium is kept in a floating layer condition and the water to be filtered is caused to flow upwardly, passing through the floating layer of filter medium for filtration. During filtering operation, the floating filter medium in granular form floats in a layer of masses to a higher level in the filter tank because of its low specific gravity, and as the floating layer is consolidated by the pressure of the streams of water caused to flow upward, the gap between individual filter material particles becomes finer to the extent that the floating layer is formed into a filter layer, through which the upward flow of water is caused to pass. Such filter layer can be washed clean by back-flow washing or flowing wash water downward therethrough.

A prior art filter apparatus using such floating filter medium has proven particularly advantageous in that back-flow washing of the filter medium can be effected only by a small amount of power which is just enough to sink the filter medium slightly despite the floating force thereof.

However, there is a problem with the prior art filter apparatus in that since the filter medium is very light in weight, if the pressure of back-flow wash water is too strong, or if the flow velocity of the back-flow wash water is out of balance with the floating-up velocity of the filter medium to the extent that the former is higher than the latter, a substantial part of the filter medium may be washed away. Conversely, if the former velocity is lower than the latter velocity, the back-flow washing operation cannot be carried out effectively. Generally, if sludge contained in the water to be filtered are caught by the layer of floating filter medium as they pass therethrough, with the result that mesh clogging is caused to the filter medium layer, a larger part of such sludge is found to have been packed closely into the filter medium layer somewhere adjacent the underside thereof to the extent that they are compactly deposited on individual particles of filter medium. For this reason, it has been difficult to separate from the filter medium such sludge deposited compactly thereon.

It is an object of this invention to provide an improved filter apparatus using floating filter medium, wherein effective means are provided for positively separating such sludge packed closely into a filter medium layer without damaging or washing away filter material particles or granules during the back-flow washing operation.

In a filter apparatus using floating filter medium, when back-flow wash water is caused to flow downward at a suitable velocity, sludge separated from the filter medium are discharged from the filter tank together with back-flow wash water since they are generally higher in specific gravity than filter medium, whereas filter medium can be retained in the filter tank in the face of the downward force of back-flow wash water because of its lower specific gravity and greater floatability. However, it has been difficult to separate sludge whose apparent specific gravity is relatively small by such downward flow of water and discharge same from the filter tank. The reason is that if back-flow wash water is caused to flow at such a high velocity as to discharge sludge having relatively low specific gravity from the filter tank, it is very difficult to accurately detect the time when sludge has been discharged and to control stopping back-flow washing quickly before filter medium is washed away.

Accordingly, in order that sludge having relatively low specific gravity can be discharged from the filter tank as well, it is necessary to separate sludge gradually from the floating filter medium layer and allow it to settle while maintaining the filter medium in floating condition and without causing the backflow wash water to flow at too high a velocity.

However, if back-flow washing is carried out at such moderate velocity only, a considerable time interval and a considerable amount of back-flow wash water are required. Moreover, with back-flow wash water at such moderate velocity, it is difficult to discharge settled sludge effectively from the filter tank.

It is another object of this invention to provide a solution to such problem and to provide a filter apparatus using floating filter medium as designed to facilitate satisfactory separation of sludge from floating filter medium during back-flow washing operation, and smooth discharge from the filter tank of sludge having relatively low specific gravity without involving loss of filter medium. More concretely, a filter apparatus uses floating filter medium wherein a filter tank is separated by a water-penetrable partition wall into an upper section forming a filtrate reservoir and a lower section forming a filter chamber, floating filter medium being placed in tne filter chamber water to be filtered being fed into the filter chamber at the bottom thereof, the water being caused to flow upwardly to pass through the floating filter medium, the resulting filtrate being removed from the filtrate reservoir. The filter apparatus being further characterized by the improvement including: an agitating blade provided at a central location in said filter chamber as viewed from above for causing upward flow of water streams, a pit provided beneath said filter chamber, a back-flow washing water discharge pipe provided in the form of a siphon-shaped pipe with a discharge opening located adjacent the bottom of the pit, said discharge pipe being provided with a siphon breaker having an air feed port positioned at a level adjacent the bottom of the filter chamber, a supply pipe having a feed opening positioned at a suitable location at or adjacent the bottom of the filter chamber and outside the pit for feeding the water to be filtered into said filter chamber.

DESCRIPTION OF THE DRAWING

Other features and advantages of the invention will be apparent from the following description taken in connection with the accompanying drawing wherein—

DESCRIPTION OF SPECIFIC EMBODIMENT

Figure 1:
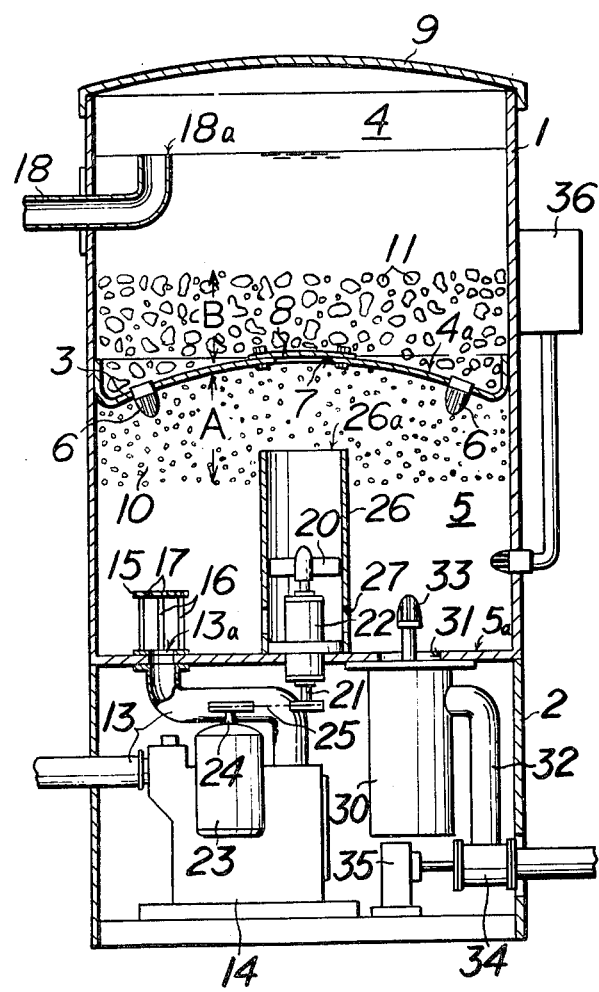
FIG. 1 is a longitudinal side view of a filter apparatus embodying the invention.
Figure 2:
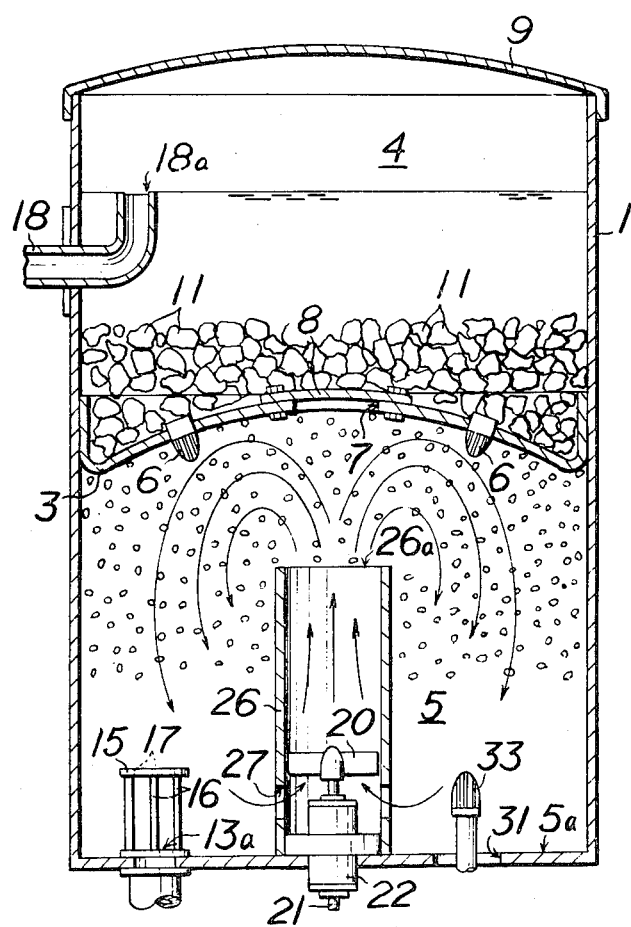
FIG. 2 is a longitudinal side view of the filter tank portion of the apparatus shown in FIG. 1 illustrating the filter medium in agitated state.
Figure 3:
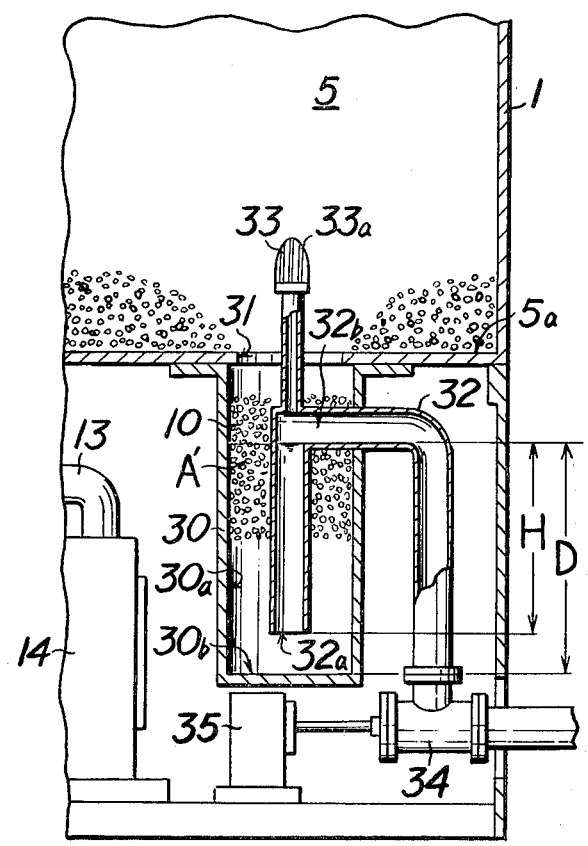
FIG. 3 is a longitudinal section of a pit seen at end of back-flow washing operation.

Referring to FIGS. 1-3, a filter tank 1 is mounted on a casing 2 forming a stand for it. The interior of the filter tank 1 is partitioned into two sections, upper and lower, by a partition wall 3, the upper section being a filtrate reservoir 4 and the lower section being a filter chamber 5.

The partition wall 3 separating the two sections 4, 5 is provided with a plurality of strainers 6 disposed at scattered locations thereon, the front end of each strainer 6 facing the filter chamber 5. Through the strainers 6 the partition wall 3 is given water penetrability. At a central point of the partition wall 3 is also provided a floating filter medium loading port 7. After any necessary amount of floating filter medium 10 is fed through it, the loading port 7 is blocked with a removable cover 8, which in turn is securely bolted to the partition wall 3.

Filter medium 10 suitable for being loaded into the filter chamber 5 can be selected from among the known floating filter medium as aforementioned, for example, granular expanded polystyrene material having a specific gravity of 0.015 to 0.2. Into the filtrate reservoir 4 above the filter chamber 5 loaded with such floating filter medium 10 is put granules of adsorbent material 11 like zeolite so as to form a layer B of suitable thickness, according to this invention.

The top of the filter tank 1 is composed of a removable cover 9 adapted to permit easy loading of such adsorbent material 11 and said filter medium 10. The filter chamber 5 is constructed in the form of a pressure vessel to permit injection of the water to be filtered into said chamber under the required pressure.

As means for feeding the water to be filtered into the filter chamber 5 there are provided a supply pipe 13 having a supply opening 13a at the bottom 5a of the filter chamber 5 and a pump 14 for injecting the water to be filtered into the filter chamber 5. A baffle plate 15 having a multiplicity of orifices 17 is disposed above the supply opening 13a and supported by a plurality of legs 16, so that as the water to be filtered is injected by the pump 14 through the supply opening 13a into the filter chamber 5, the water is essentially evenly dispersed by the baffle plate 15 throughout the whole area adjacent the bottom 5a of the filter chamber 5 and then caused to flow upwardly in streams.

Thus, in the filter chamber 5, the water is filtered as it passes upwardly through the layer A of floating filter medium. The water passes through the strainers 6 and through the layer B of adsorbent material like zeolite into the reservoir 4 until it reaches a predetermined level, where it is collected as filtrate. For this purpose, a filtrate collecting pipe 18 is provided so that one end thereof forming an overlow outlet port 18a is positioned at a higher level than the top of layer B of adsorbent material 11 in the reservoir 4.

In the filter chamber 5, an agitating blade 20 and a pit 30 are also provided in accordance with the invention. The agitating blade 20 is disposed centrally in the filter chamber 5 as viewed from above, its rotation shaft 21 is supported in bearing means 22 extending through the bottom 5a of the filter chamber 5. The rotation shaft 21 is connected to a drive motor 23 through a belt 25 trained around a pulley engaging the rotation shaft 21 and a pulley engaging the shaft 24 of the drive motor 23.

The agitating blade 20 is such that when it is driven, the water being filtered in the filter chamber 5 is spouted upwardly in the middle of the filter chamber 5 so that the upwardly spouted water strikes against the undersurface of the partition wall 3 and scatters radially in streams, falling along the inner periphery of the filter chamber 5 to be circulated (FIG. 2).

In this embodiment, a tubular structure 26 extending vertically from the bottom 5a of the filter chamber 5 is provided in such a way as to enclose the agitating blade 20 for reinforcing upward flow of water in said circulation of streams. The tubular structure 26 has a height sufficient to ensure that the top end thereof extends into the floating filter medium 10 during filtering operation and is provided, at a lower part thereof, with opening to allow the water in the filter chamber 5 to pass through the tubular structure for circulation.

At suitable locations at the bottom 5a of the filter chamber 5 are provided openings 31 under which a pit 30 is mounted securely. A discharge pipe 32 for back-flow wash water communicates with the pit 30 through side wall 30a thereof. Referring to FIG. 3, the discharge pipe 32 is shaped like a siphon or U-shaped in accordance with this invention, and one end thereof having an opening 32a is positioned adjacent the bottom 30b of the pit 30. In this embodiment, the discharge pipe 32 has its top portion 32b positioned inside the pit 30. Said top portion 32b is so arranged as to communicate with a siphon breaker 33 having an air feeding port 33a at one end thereof, said air feeding port 33a being positioned at a level adjacent the bottom 5a of the filter chamber 5. For the purpose of preventing the influx of filter medium 10, the air feeding port 33a of the siphon breaker 33 is of same construction as the strainer 6.

The discharge pipe 32 for back-flow wash water has a solenoid valve 34 inserted therein so that the start and stop of back-flow wash water discharge is controlled by a solenoid 35 which in turn is start-and-stop controlled by a timer (not shown).

In the filter apparatus of this invention is also provided a sensor 36 (FIG. 1) for detecting the pressure in the filter chamber 5 so that any mesh clogging of floating filter medium 10 will be automatically detected. More concretely, in the course of operation of the filter apparatus, if the sensor 36 detects that the pressure of the water being filtered has reached a certain level, the pump 14 stops automatically and filtering operation is brought to stop. Subsequently, in accordance with a certain timer-controlled program, the agitating blade 20 is first actuated for a particular time interval (for example, 1 to 2 min.) and at some interval after the stopping of the agitating blade 20 (for example, 10 to 20 sec.), the solenoid valve 34 is opened.

When the solenoid valve 34 is opened automatically by the action of the timer (not shown), the filtrate stored in the reservoir 4 is caused to flow back into the filter chamber 5 through the strainers 6, travelling downwardly in the filter chamber 5 until it is discharged therefrom through the discharge pipe 32, whereby the filter medium 10 is washed clean.

Now referring to the operation of the filter apparatus according to this invention in more detail in connection with the embodiment, filtering operation, as can be readily seen from the foregoing description, is carried out by actuating the pump 14 while the solenoid valve 34 is closed and by injecting the water to be filtered through the supply opening 13a into the filter chamber 5. The water so injected is dispersed at a level adjacent the bottom 5a of the filter chamber 5 in all directions and caused to flow upwardly in uniform streams. Filtration is effected as such upward flow of water passes through the layer A of floating filter medium 10. Since the layer B of granular adsorbent material 11 like zeolite is present at the bottom 4a of the reservoir 4 into which the filtered water is introduced through a plurality of strainers 6, the upward streams of water meet with resistance from the layer B of adsorbent material 11, and consequently filtration in the filter chamber 5 is carried out at a level adjacent to the bottom of the layer A of floating filter medium 10 without sludge being vigorously injected deep into said layer A consolidated by the upward flow of water. The filtrate resulting from this process is removed from the filter apparatus, through the overflow outlet port 18a after it is freed from ammonium, odor and the like contained therein, if any.

In the foregoing embodiment, adsorbent material 11 like zeolite is placed in the reservoir 4. Activated carbon may be used instead of zeolite. In another form of the invention, it is possible that sand be used instead of adsorbent material in the reservoir 4, or sand and such adsorbent material as aformentioned may be used in layers, one on the other, or in mixed form of layers, being placed on the partition wall 3.

As already described, back-flow washing operation is carried out if mesh clogging is caused to the layer A of floating material 10. In the filter apparatus according to the invention, prior to back-flow washing, it is possible to spout the water being filtered upwardly in the middle of the filter chamber 5 and disperse the water radially to circulate it, whereupon sludge deposited on the filter material granules can be positively separated from the surface of individual filter material granules through vigorous streams resulting from the agitation. If it is left to stand for some time interval (for example, 10 to 30 sec.) after the agitating blade 20 has stopped, the floating filter medium 10 in the filter chamber 5 will float upward again to form layer A, and the sludge separated from the filter medium 10 will settle in the filter chamber 5.

When the floating filter medium 10 has almost completely floated, the solenoid valve 34 is opened and the filter medium 10 is washed by the downward streams of filtrate flowing down through the strainers 6. In the filter apparatus of the invention, if the flow of back-flow washing water is so slow as to merely cause the layer A of filter medium to be slightly larger in thickness or to cause no filter material to be washed away, the floating layer of sludge can be effectively separated from the floating layer A of filter material 10 before the layer A falling together with the back-flow washing water reaches a level adjacent the bottom. The sludge is allowed to flow down at a faster velocity than the back-flow washing water which flows down while washing the filter medium 10. The sludge so separated is guided into the pit 30, from where they are discharged through the discharge pipe 32 whose outlet opening 32a is positioned at the bottom of the pit 30.

The discharge pipe 32 is shaped like a siphon. Its top portion 32b communicates with a siphon breaker 33 having an air feeding port 33a positioned at a level adjacent the bottom 5a of the filter chamber 5. If the water level in the filter chamber 5 is lowered to the extent that the air feeding port 33a of the siphon breaker 33 is exposed to air, air is sucked therethrough into the pit 30. Accordingly, the velocity of back-flow washing water discharge is decreased, and, when the water level reaches the top portion 32b of the discharge pipe 32, the discharge of back-flow washing water is automatically stopped.

In the filter apparatus employing the floating filter medium according to the invention, if the depth D of the pit 30 (counting from the top portion 32b of the discharge pipe 32 and up to the pit bottom 30b) is reasonably deep and if the height H from the opening 32a of the siphon-shaped discharge pipe 32 to said top portion 32b is reasonably high (at least $H > A$), it is possible that, as FIG. 3 illustrates, when the discharge of back-flow washing water is automatically stopped, a larger part of the floating filter medium is piled up on the bottom 5a of the filter chamber 5 and that the floating layer A' of filter medium 10 led into the pit 30 is positioned at a higher level than the opening 32a of the discharge pipe 32. It follows that little or no sludge is present below the level of the layer A' of filter medium 10 in the pit 30. Further, the sludge staying at the bottom of the pit 30 is unlikely to float back into the filter chamber 5 when next cycle of filter operation starts, since the water to be filtered is introduced through the supply port 13a into the filter chamber 5 without passing through the pit 30. In the next following discharge operation for back-flow washing water, the sludge will be first discharged from the apparatus.

Filter operation is resumed in such a way that the solenoid valve 34 is closed through timer control in some minutes (e.g., 3 to 6 min., the time required for wash-back operation) after the solenoid vlave 34 is opened for start of back-flow washing, and that in some time interval (10 sec, or so) thereafter operation is automatically controlled when the feed of water to be filtered is resumed. Needless to say, the time setting for back-flow washing operation must be made so that the operation will be completed by the siphon breaker control within the set time.

Figure 4:
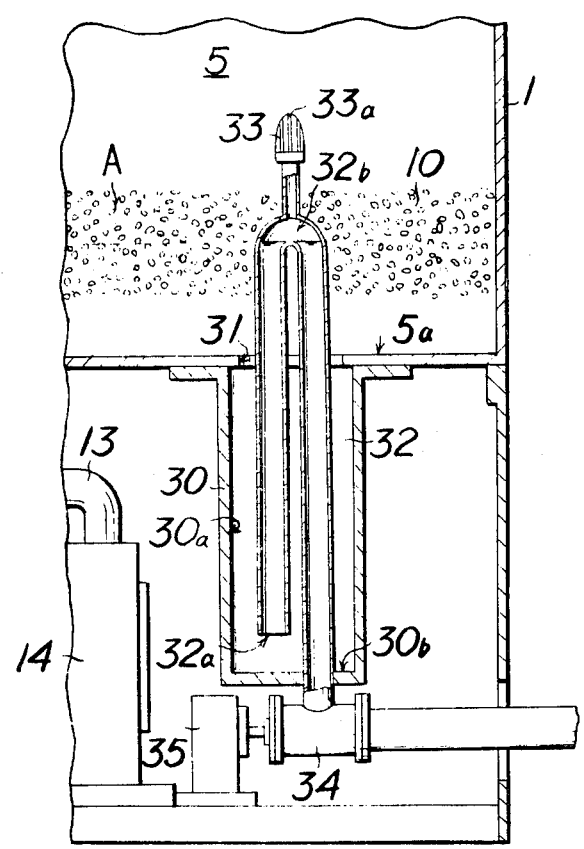
FIG. 4 is a longitudinal section showing a back-flow wash water discharge pipe and a pit in another embodiment of the invention.

In the above described embodiment, the top portion 32b of the siphon-shaped discharge pipe 32 is positioned in the pit 30. In another form of the invention, as shown in FIG. 4, the top portion 32b of the siphon-shaped discharge pipe 32 is positioned at a suitable level in the filter chamber 5, whereby if the discharge of back-flow washing water is automatically stopped through control by siphon breaker 33, the bottom of the layer A of filter medium 10 reaches a level adjacent to that of the bottom 5a of the filter chamber 5. In other words, it is possible to control so that the back-flow wash water containing sludge settles at least to a certain level in the pit 30, or to a depth from which the sludge-containing water is unable to float when water to be filtered is injected into the filter chamber during next cycle of operation. As already mentioned, such sludge retained in the pit 30 will remain in the pit 30 during next filter operation and will be first discharged from the filter apparatus 1 during the next operation for discharge of back-flow washing water.

As will be easily understood from the above description, in the filter apparatus according to the invention, when back-flow washing is necessary, the sludge adhering to the filter medium is positively separated from the individual filter material granules through vigorous agitation by the agitating blade of the water being filtered prior to back-flow washing, and thereafter the filter medium is washed by flowing downward the filtrate stored above the chamber. Therefore, back-flow washing can be effected by using less amount of backflow wash water. Back-flow washing can be effectively carried out by such slow downward flow as may involve no loss of filter medium. Moreover, the provision of a pit under the bottom of the filter chamber makes it possible that sludge having a smaller apparent gravity which has almost denied separation by slow downward flow of back washing water are guided into the pit, all or almost all filter medium being kept in the filter chamber or outside the pit. Such sludge is retained in the pit until it is positively discharged from the filter chamber during next back-flow washing operation.

Therefore, the filter apparatus using the floating filter medium eliminates such disadvantages involved in floating filter medium as earlier mentioned. It makes it possible to carry out continuous operation wherein filtration and back-flow washing are automatically carried out on an alternate basis.

I claim:

1. A filter apparatus using floating filter medium comprising a filter tank separated by a water-penetrable partition wall into an upper section forming a filtrate reservoir and a lower section forming a filter chamber, floating filter medium in the filter chamber, means for feeding water to be filtered into the bottom of the filter chamber, the water being caused to flow upwardly passing through the floating filter medium and through the partition wall, the resulting filtrate being removed from the filtrate reservoir, the filter apparatus being further characterized by the improvement comprising an agitating blade provided at a central location in said filter chamber as viewed from above for causing upward flow of water streams, a pit provided beneath said filter chamber, a back-flow washing water discharge pipe provided in the form of a siphon-shaped pipe with a discharge opening thereof located adjacent the bottom of the pit, said discharge pipe being provided with a siphon breaker having an air feed port positioned at a level adjacent the bottom of the filter chamber, said means for feeding water including a supply pipe having a feed opening positioned at a suitable location at or adjacent the bottom of the filter chamber and outside the pit for feeding the water to be filtered into said filter chamber.

2. The filter apparatus as set forth in claim 1 wherein said agitating blade is disposed in a vertical tubular structure whose top is open and extends into a layer of floating filter medium and which has at a lower part thereof openings for passage of water to be filtered.

3. The filter apparatus as set forth in claim 1 or claim 2 wherein said pit is a tubular structure mounted to the underside of the filter tank and having a closed bottom end.

4. The filter apparatus as set forth in claim 1 wherein said siphon breaker communicates with said discharge pipe for back-flow wash water at the top portion of the latter in the pit.

5. The filter apparatus as set forth in claim 1 wherein the top portion of said siphon-shaped discharge pipe for back-flow wash water is located in the filter chamber outside the pit.

6. The filter apparatus as set forth in claim 1 wherein absorbent material such as zeolite or activated carbon in granular form is placed in layer over said water-penetrable partion wall defining the bottom of said filtrate reservoir and a filtrate discharge port is located in said filtrate reservoir and at a level above said absorbent material layer.

7. The filter apparatus as set forth in claim 1 wherein sand is placed in layer over said water-penetrable partition wall defining the bottom of said filtrate reservoir and a filtrate discharge port is located in said filtrate reservoir and at a level above said layer of sand.

8. The filter apparatus as set forth in claim 1 wherein adsorbent material such as zeolite or activated carbon in granular form and sand are placed in layers, one over the other, or in mixed layers, over said water-penetrable partition wall defining the bottom of said filtrate reservoir and a filtrate discharge port is located in said filtrate reservoir and at a level above said layers of adsorbant material and sand.

9. The filter apparatus as set forth in claim 1 wherein said filtrate discharge port is an overflow outlet port for filtrate from the filtrate reservoir.

10. The filter apparatus as set forth in claim 1 wherein a baffle plate having a multiplicity of orifices is provided in the filter chamber and near said supply pipe for water to be filtered.

* * * * *